United States Patent [19]

Baker et al.

[11] Patent Number: 5,308,805

[45] Date of Patent: May 3, 1994

[54] NEUTRAL, LOW TRANSMITTANCE GLASS

[75] Inventors: Rodney G. Baker; Paige L. Higby, both of Maumee, Ohio

[73] Assignees: Libbey-Owens-Ford Co., Toledo, Ohio; Pilkington Plc, St. Helens, England

[21] Appl. No.: 57,742

[22] Filed: May 5, 1993

[51] Int. Cl.$^5$ ................................................ C03C 3/04
[52] U.S. Cl. ...................................................... 501/71
[58] Field of Search ........................ 501/64, 69, 70, 71

[56] References Cited

U.S. PATENT DOCUMENTS

| | | | |
|---|---|---|---|
| 4,339,541 | 7/1982 | Dela Ruye | 501/71 |
| 4,764,487 | 8/1988 | Lewis | 501/70 |
| 5,190,896 | 3/1993 | Pucilowski et al. | 501/64 |

Primary Examiner—Mark L. Bell
Assistant Examiner—A. Wright
Attorney, Agent, or Firm—Marshall & Melhorn

[57] ABSTRACT

A neutral, generally green-gray low transmittance (no more than 25 luminous transmittance) soda-lime-silica glass has reduced solar energy transmittance when provided with the following colorant constituents in percent by weight:

| | |
|---|---|
| $Fe_2O_3$ (total iron) | 1.3–2 |
| NiO | 0.01–0.05 |
| CoO | 0.02–0.04 |
| Se | 0.0002–0.003 |

The glass has a ferrous value in the range of 18 to 30.

24 Claims, No Drawings

NEUTRAL, LOW TRANSMITTANCE GLASS

FIELD OF THE INVENTION

The present invention relates to a dark, neutral colored glass that has low visible light transmittance, particularly low ultraviolet radiation transmittance, and low total solar energy transmittance. Although not limited to a particular use, the glass exhibits a combination of properties that makes it highly desirable for use in privacy glazings such as in the rear portions of vehicles such as vans. These properties include low visible light transmittance to reduce visibility of the contents of the vehicle, low infrared and total solar energy transmittance to reduce heat gain in the interior of the enclosure, low ultraviolet radiation transmittance to protect fabrics and other interior components from degradation, preferably a neutral green-gray color for the sake of coordinating with a wide range of interior and exterior finish colors, and a composition compatible with flat glass manufacturing methods, e.g., conventional commercial float glass processes.

BACKGROUND OF THE INVENTION

Glasses with good infrared absorption are usually produced by reducing iron present in the glass to the ferrous state or by adding copper. Such materials give glasses a blue color. The materials added to achieve good ultraviolet radiation absorption are $Fe^{3+}$, Ce, Ti or V. The quantities added to cause the desired level of ultraviolet absorption are such as to tend to color the glass yellow. The combination in the same glass of both good UV and good IR absorption gives glasses whose color is either green or blue. Proposals have been made to produce vehicle glazings with good protection against IR and UV radiation in gray or bronze, but the proposed glasses tend to have a greenish yellow tinge.

Prior art heat absorbing glasses which are neutral and of a blue, green, gray or bronze tint tend to have considerably higher solar light transmittances than would be desirable in privacy glazings. For example, U.S. Reissue Pat. No. 25,312 is directed to a gray glass composition containing 0.2 to 1 percent $Fe_2O_3$, 0.003 to 0.05 percent NiO, 0.003 to 0.02 percent CoO and 0.003 to 0.02 percent Se and having a visible transmittance of between 35 and 45 percent at 0.25 inch thickness.

A typical dark gray prior art glass has the following composition: 72.9% $SiO_2$, 13.7% $Na_2O$, 0.03% $K_2O$, 8.95% CaO, 3.9% MgO, 0.10% $Al_2O_3$, 0.27% $SO_3$, 0.06% $Fe_2O_3$, 0.015% CoO and 0.095% NiO. Solar energy absorption of this type of glass is not as low as would be desired for the purposes of the present invention.

More recently nickel-free heat absorbing gray glasses have been proposed for use in low transmittance glazings. Examples of these glasses may be found in U.S. Pat. Nos. 4,104,076 and 5,023,210. However, both of these patents include chromic oxide as a coloring agent, may require the use of melting operations/apparatus other than conventional overhead fired tank-type melting furnaces to provide the reducing conditions during melting necessary to produce the desired glasses, and have colorant concentrations of iron oxide, cobalt oxide and selenium that would not produce the particular combination of properties desired here.

The most promising glazings found to date to be suitable for use in privacy applications require glass substrates having films or coatings thereon to achieve the desired properties. An example of one such particularly effective glazing is described in U.S. Pat. No. 5,087,525 to R. D. Goodman and P. J. Tausch. While these filmed glazings are indeed beneficial and enable "fine tuning" of spectral properties, it would be advantageous, particularly from a cost standpoint, to produce a glass composition which by itself would provide a desired mix of properties for privacy glazings.

SUMMARY OF THE INVENTION

We have identified a requirement for excellent neutral privacy glasses such that, in the CIELAB system, they have a color coordinate range: a* of $-5\pm5$, preferably $-4\pm3$, most desirably $-4$; b* of $0\pm10$, preferably $+4\pm1$, most desirably $+3$; and L* of $50\pm10$, preferably $50\pm5$, most desirably $48\pm2$, at visible light transmittances of no more than 25% and preferably no more than 20%. More particular, at a nominal reference thickness of 4 mm the glass of the present invention exhibits a visible light transmittance (C.I.E. Illuminate A) of no more than 25%, a total solar energy transmittance of no more than 25% and preferably no more than 18% and in any case no more than the visible light transmittance, and an ultraviolet radiation transmittance of no more than 18% and preferably no more than 15%*. These neutral, generally green-gray glasses, having a shading coefficient of no more than 0.53 and preferably no more than 0.46, are produced with a standard soda-lime-silica float glass base composition to which is added iron oxide, cobalt oxide, nickel oxide and selenium in certain critical proportions. More particularly, it has been discovered that these desired glasses can be provided by employing nickel oxide in combination with a high total iron glass in which the $Fe_2O_3$ is reduced to provide a specific ratio of FeO to $Fe_2O_3$ (total iron), conventionally referred to as ferrous value.

| Ultraviolet | 300–400 nanometers |
| Visible | 380–720 nanometers |
| Total Solar | 300–2130 nanometers |

* Radiation transmittance values disclosed herein are based upon the following wavelength ranges:

In the above connection, it is common in the glass industry to refer to the total iron contained in a glass composition or batch as "total iron expressed as $Fe_2O_3$". When a glass batch is melted, however, some of this amount of total iron is reduced to FeO, while the rest remains $Fe_2O_3$. The balance between ferrous and ferric oxides in the melt is a result of the oxidation-reduction equilibrium. Reduction of $Fe_2O_3$ produces not only FeO, but oxygen gas as well, thus decreasing the combined weight of the two iron compounds in the resultant glass product. Consequently, the combined weight of the actual FeO and $Fe_2O_3$ contained in a resulting glass composition will be less than the batch weight of the total iron expressed as $Fe_2O_3$. For this reason, it shall be understood that "total iron" or "total iron expressed as $Fe_2O_3$", as used herein and in the appended claims, means the total weight of iron contained in the glass batch before reduction. It should further be understood that "ferrous value", as used herein and in the appended claims, is defined as the weight percent ferrous oxide in the resultant glass divided by the weight percent of total iron expressed as $Fe_2O_3$.

Unless otherwise noted, the term "percent (%)" and "parts", as used herein and in the appended claims, means percent (%) and parts by weight. Wavelength dispersive X-ray fluorescence was used to determine the weight percents of NiO, Co$_3$O$_4$, and Se and total iron expressed as Fe$_2$O$_3$. Percent reduction of total iron was determined by first measuring the radiant transmission of a sample at a wavelength of 1060 nanometers, using a spectrophotometer. The 1060 nm transmission value was then used to calculate optical density, using the following formula:

$$\text{Optical density} = \text{Log}_{10} \frac{T_o}{T} \quad \begin{array}{l} (T_o = 100 \text{ minus estimated loss} \\ \text{from reflection} = 92; T = \\ \text{transmission at 1060 nm}). \end{array}$$

The optical density was then used to calculate the percent reduction:

$$\frac{\text{percent}}{\text{reduction}} = \frac{(110) \times (\text{optical density})}{(\text{Glass thickness in mm}) \times (\text{wt \% total Fe}_2\text{O}_3)}$$

Dark neutral colored glass in accordance with the invention can be produced using iron, cobalt, nickel, and selenium as the colorants in the following ranges:

| Component | Weight Percent of Total Glass | |
|---|---|---|
| | Range | Preferred Range |
| Fe$_2$O$_3$ (total iron) | 1.3–2 | 1.3–1.6 |
| NiO | 0.01–0.05 | 0.0225–0.0285 |
| Co$_3$O$_4$ | 0.02–0.04 | 0.020–0.026 |
| Se | 0.0002–0.0030 | 0.0010–0.0020 |
| Ferrous Value | 18–30% | 20–24% |

Neutral coloration of a green-gray glass is marked by low excitation purity. The glass of the present invention advantageously exhibits an excitation purity less than 10 percent, and less then 8 percent in preferred embodiments. The glasses of the present invention yield a relatively narrow range of dominant wavelengths ranging from 490 to 565 nanometers, and preferably from 545 to 565.

Glasses of the present invention exhibit the following CIELAB color coordinates: $a^* = -5\pm5$; $b^* = 0\pm10$; $L^* = 50\pm10$.

The presence of nickel (nickel oxide) is essential in compositions of the invention. A conventional float tank which is under stable operation will equilibrate at a certain ferrous level. This ferrous level will depend on the total amount of iron in the glass, redox of the flames, etc. The "equilibrium" ferrous value for a float tank at the preferred total iron level is such that nickel oxide must be added to achieve the desired total solar transmittance and shading coefficient target.

The alternative to using nickel oxide at the equilibrium ferrous value is to add a reducing agent, for example carbon, to the batch to increase the ferrous value, which will reduce the total solar transmittance. This is not desirable because of the risk that the glass can become colored by iron sulfide (amber formation) due to the high iron-carbon combination.

DETAILED DESCRIPTION

Soda-lime-silica glass may be essentially characterized by the following composition on a weight percentage basis of the total glass:

| | |
|---|---|
| SiO$_2$ | 68–75% |
| Na$_2$O | 10–18 |
| CaO | 5–15 |
| MgO | 0–5 |
| Al$_2$O$_3$ | 0–5 |
| K$_2$O | 0–5 |

Other minor ingredients, including melting and refining aids such as SO$_3$, may also appear in the glass composition. Small amounts of BaO or B$_2$O$_3$ have also sometimes been included in flat glass and may be considered optional. To this base glass are added the coloring constituents of the present invention set forth above.

The glass is essentially free of colorants other than those specifically recited with the exception of any trace amounts of such colorants that may be present as impurities. The glass of the present invention may be melted and refined continuously in a conventional tank type melting furnace and formed into flat glass sheets of varying thicknesses by the float method in which the molten glass is supported on a pool of molten metal, usually tin, as it assumes a ribbon shape and is cooled.

Examples 1 through 6 are all satisfactory embodiments of the present invention that exhibit a pleasing neutral green-gray appearance and provide excellent reduction of solar energy transmittance and a very desirable shading coefficient*. Thus, luminous transmittance ("Ill A") is less than 20% for all of these examples at a reference thickness of 4 mm. The total solar energy transmittance ("TS") of each example is less than 18% and in all cases is less than the luminous transmittance. The ultraviolet radiation transmittance is exceptionally low in each of the examples, with none exceeding 13 percent. The shading coefficient of each example is in all instances not greater than 0.47.

* Shading Coefficient is calculated from Lawrence Berkely Laboratories' Window 3.1 software program which is based on an outdoor temperature of 89° F. (32° C.), an indoor temperature of 75° F. (24° C.), a solar intensity of 248 Btu/(hr×sq ft), (789 W/sq m), and a 7.5 mph (12 kph) wind.

TABLE I

| | Ex. 1 | Ex. 2 | Ex. 3 | Ex. 4 | Ex. 5 | Ex. 6 |
|---|---|---|---|---|---|---|
| Total Fe$_2$O$_3$ | 1.364 | 1.653 | 1.628 | 1.428 | 1.431 | 1.420 |
| % Ferrous | 20.1 | 19.7 | 27.7 | 21.2 | 22.3 | 21.6 |
| % Co3O4 | 0.0212 | 0.0236 | 0.0223 | 0.0198 | 0.0213 | 0.0242 |
| % NiO | 0.0257 | 0.0256 | 0.0125 | 0.0409 | 0.0271 | 0.0283 |
| % Se | 0.0020 | 0.0020 | 0.0015 | 0.0019 | 0.0017 | 0.0014 |
| Ill A | 19.6 | 16.0 | 17.8 | 19.6 | 18.1 | 18.0 |
| TS | 17.5 | 13.4 | 11.5 | 16.2 | 15.0 | 15.5 |
| UV | 12.3 | 7.9 | 10.3 | 11.6 | 11.3 | 10.1 |
| L* | 51.7 | 47.1 | 50.1 | 51.4 | 49.8 | 49.7 |
| a* | −3.14 | −4.32 | −6.65 | −3.51 | −3.78 | −3.70 |
| b* | +3.39 | +4.55 | −2.17 | +4.96 | +3.31 | +3.24 |
| Dom. Wave | 560.8 | 560.1 | 490.8 | 565.0 | 556.0 | 556.0 |

TABLE I-continued

| | Ex. 1 | Ex. 2 | Ex. 3 | Ex. 4 | Ex. 5 | Ex. 6 |
|---|---|---|---|---|---|---|
| % Purity | 4.5 | 6.5 | 8.0 | 7.0 | 4.3 | 4.3 |

The base glass composition for Example 6 is as follows:

| Component | Weight Percent of Total Glass |
|---|---|
| $SiO_2$ | 73.2 |
| $Na_2O$ | 13.9 |
| CaO | 7.8 |
| MgO | 3.4 |
| $SO_3$ | 0.20 |
| $Al_2O_3$ | 0.17 |
| $K_2O$ | 0.40 |

The batch mixture for Example 6 was:

| Constituent | Parts by Weight |
|---|---|
| Sand | 154 grams (g) |
| Soda Ash | 50 g |
| Gypsum | 1 g |
| Limestone | 11 g |
| Dolomite | 33 g |
| Sodium nitrate | 0.5 g |
| Rouge | 3.12 g |
| Selenium* | .025 g |
| $Co_3O_4$ | .0465 g |
| NiO | .0595 g |

*Assume a 10% Se retention.

Glass made by the float process typically ranges in thickness from about 2 to 10 millimeters. For the preferred solar radiation control features of the present invention, it is preferred that the transmittance properties described herein be obtained within the thickness range of 3 to 5 millimeters.

Other variations as are known to those of skill in the art may be resorted to without departing from the scope of the invention as defined by the claims that follow.

What is claimed is:

1. A soda-lime-silica glass having a base glass composition comprising on a weight percent basis: 68-75% $SiO_2$, 10-18% $Na_2O$, 5-15% CaO, 0-5% MgO, 0-5% $Al_2O_3$ and 0-5% $K_2O$, and colorants consisting essentially of from about 1.3 to 2 weight percent $Fe_2O_3$ (total iron), from about 0.01 to 0.05 weight percent NiO, from about 0.02 to 0.04 weight percent $Co_3O_4$ and from 0.0002 to 0.003 weight percent Se, and having a ferrous value in the range of 18 to 30 percent; the glass having a shading coefficient of no more than 0.53.

2. A glass as defined in claim 1, having a color defined by the following CIELAB coordinates: $a^* = -5 \pm 5$; $b^* = 0 \pm 10$; $L^* = 50 \pm 10$.

3. A glass as defined in claim 1, having a color defined by the following CIELAB coordinates: $a^* = -4 \pm 3$; $b^* = +4 \pm 1$; $L^* = 50 \pm 5$.

4. A glass as defined in claim 1, having a dominant wavelength in the range of 490 to 565 and an excitation purity of less than 10.

5. A glass as defined in claim 1, having a dominant wavelength in the range of 545 to 565 and an excitation purity of less than 8.

6. A soda-lime-silica glass having a base glass composition comprising on a weight percent basis: 68-75% $SiO_2$, 10-18% $Na_2O$, 5-15% CaO, 0-5% MgO, 0-5% $Al_2O_3$ and 0-5% $K_2O$, and colorants consisting essentially of from about 1.3 to 2 weight percent $Fe_2O_3$ (total iron), from about 0.01 to 0.05 weight percent NiO, from about 0.02 to 0.04 weight percent $Co_3O_4$ and from 0.0002 to 0.003 weight percent Se, and having a ferrous value in the range of 18 to 30 percent; the glass having a visible light transmittance of no more than 25 percent, a total solar energy transmittance of no more than 25 percent and an ultraviolet radiation transmittance of no more than 15 percent at a nominal thickness of 4 millimeters.

7. A glass composition as defined in claim 6, wherein said weight percent $Fe_2O_3$ (total iron) is in the range of 1.3 to 1.6 percent.

8. A glass composition as defined in claim 6, wherein said NiO is present in the range of 0.0225 to 0.0285 weight percent.

9. A glass composition as defined in claim 6, wherein said $Co_3O_4$ is present in the range of 0.020 to 0.026 weight percent.

10. A glass composition as defined in claim 6, wherein said Se is present in the range of 0.0010 to 0.0020 weight percent.

11. A glass composition as defined in claim 6, wherein said ferrous value is in the range of from about 19 to about 28 percent.

12. A glass composition as defined in claim 11, having a ferrous value in the range of from about 20 to about 24 percent.

13. A glass as defined in claim 6, having a color defined by the following CIELAB coordinates: $a^* = -5 \pm 5$; $b^* = 0 \pm 10$; $L^* = 50 \pm 5$.

14. A glass as defined in claim 6, having a shading coefficient of no more than 0.53.

15. A soda-lime-silica glass having a base glass composition comprising on a weight percent basis: 68-75% $SiO_2$, 10-18% $Na_2O$, 5-15% CaO, 0-5% MgO, 0-5% $Al_2O_3$ and 0-5% $K_2O$, and colorants consisting essentially of from about 1.3 to 2 weight percent $Fe_2O_3$ (total iron), from about 0.01 to 0.05 weight percent NiO, from about 0.02 to 0.04 weight percent $Co_3O_4$ and from 0.0002 to 0.003 weight percent Se, and having a ferrous value in the range of 18 to 30 percent; the glass having a visible light transmittance of no more than 20 percent, a total solar energy transmittance of no more than 18 percent and not exceeding the value of the visible light transmittance, and an ultraviolet radiation transmittance of no more than 15 percent at a nominal thickness of 4 millimeters.

16. A glass as defined in claim 15, having a shading coefficient of no more than 0.53.

17. A glass as defined in claim 16, having a shading coefficient of no more than 0.46.

18. A soda-lime-silica glass having a base glass composition comprising on a weight percent basis: 68-75% $SiO_2$, 10-18% $Na_2O$, 5-15% CaO, 0-5% MgO, 0-5% $Al_2O_3$ and 0-5% $K_2O$, and colorants consisting essentially of from about 1.3 to 1.6 weight percent $Fe_2O_3$ (total iron), from about 0.0225 to 0.0285 weight percent NiO, from about 0.020 to 0.026 weight percent $Co_3O_4$ and from 0.0010 to 0.0020 weight percent Se, and having a ferrous value in the range of 18 to 30 percent; the glass having a visible light transmittance of no more than 25 percent, a total solar energy transmittance of no more than 25 percent and an ultraviolet radiation transmittance of no more than 15 percent at a nominal thickness of 4 millimeters.

19. A glass as defined in claim 18, said glass having ferrous value in the range of 20 to 24.

20. A glass as defined in claim 19, said glass having a visible light transmittance of no more than 20 percent, a total solar energy transmittance of no more than 18 percent and not exceeding the value of the visible light transmittance, and ultraviolet radiation transmittance of no more than 15 percent.

21. A glass as defined in claim 18, said glass having a shading coefficient of no more than 0.46.

22. A glass as defined in claim 18, having a dominant wavelength in the range of 545 to 565 and an excitation purity of less than 8.

23. A glass as defined in claim 18, having a color defined by the following CIELAB coordinates: $a^* = -4 \pm 3$; $b^* = +4 \pm 1$; $L^* = 50 \pm 5$.

24. A glass as defined in claim 23, having a color defined by the CIELAB coordinates $a^* = -4$; $b^* = +3$; $L^* = 48 \pm 2$.

* * * * *